(12) United States Patent
Hsu (10) Patent No.: US 12,092,887 B2
(45) Date of Patent: *Sep. 17, 2024

(54) FIBER OPTIC DISTRIBUTION FRAME

(71) Applicant: Gloriole Electroptic Technology Corp., Kaohsiung (TW)

(72) Inventor: Hsien-Hsin Hsu, Kaohsiung (TW)

(73) Assignee: GLORIOLE ELECTROPTIC TECHNOLOGY CORP., Kaohsiung (TW)

( * ) Notice: Subject to any disclaimer, the term of this patent is extended or adjusted under 35 U.S.C. 154(b) by 52 days.

This patent is subject to a terminal disclaimer.

(21) Appl. No.: 17/840,364

(22) Filed: Jun. 14, 2022

(65) Prior Publication Data

US 2023/0068980 A1 Mar. 2, 2023

(30) Foreign Application Priority Data

Aug. 30, 2021 (TW) ................................. 110210205

(51) Int. Cl.
*G02B 6/00* (2006.01)
*G02B 6/44* (2006.01)

(52) U.S. Cl.
CPC .................. *G02B 6/4452* (2013.01)

(58) Field of Classification Search
CPC ................ G02B 6/4452; G02B 6/00
See application file for complete search history.

(56) References Cited

U.S. PATENT DOCUMENTS 10,558,007 B2 * 2/2020 Brown ................. G02B 6/4452
2019/0072736 A1 * 3/2019 Glatzl ................. G02B 6/4471

FOREIGN PATENT DOCUMENTS

CN 103221864 A * 7/2013 ........... G02B 6/4452

* cited by examiner

*Primary Examiner* — Jennifer Doan
(74) *Attorney, Agent, or Firm* — MUNCY, GEISSLER, OLDS & LOWE, P.C.

(57) ABSTRACT

A fiber optic distribution frame includes a casing and a plurality of tray units disposed in the casing. Each tray unit includes a partition plate, a plurality of inner guiding rails disposed on the partition plate, and a plurality of mounting seats each disposed between adjacent two of the inner guiding rails and movable forwardly and rearwardly to be removed from the adjacent two of the inner guiding rails.

9 Claims, 11 Drawing Sheets

FIBER OPTIC DISTRIBUTION FRAME

CROSS-REFERENCE TO RELATED APPLICATION

This application claims priority of Taiwanese Utility Model Patent Application No. 110210205, filed on Aug. 30, 2021.

FIELD

The disclosure relates to a device for a fiber optic transmission system, more particularly to a fiber optic distribution frame.

BACKGROUND

A fiber optic distribution frame is an important apparatus in a fiber optic transmission system, and is mainly used for arranging fiber optic connectors and optical fibers. Multiple sets of fiber optic connectors and optical fibers are disposed in a conventional fiber optic distribution frame. When maintenance of the fiber optic connectors and the optical fibers are required or when additional elements need to be installed, it is necessary to dissemble and re-assemble mounting seats that are fastened by screws and that carry elements of the conventional fiber optic distribution frame, which is troublesome. Additionally, since the mounting seats can only be moved forwardly in one direction, mounting positions on the conventional fiber optic distribution frame are limited and the flexibility of installation, disassembling and assembling the mounting seats is reduced.

SUMMARY

Therefore, an object of the disclosure is to provide a fiber optic distribution frame that is convenient for maintenance.

According to an aspect of the disclosure, a fiber optic distribution frame includes a casing unit and a plurality of tray units. The tray units are stacked on one another along an up-down direction and are disposed in the casing unit. Each of the tray units includes a partition plate, a plurality of inner guiding rails, and a plurality of mounting seats. The inner guiding rails are disposed on and above the partition plate and are spaced apart from one another along a horizontal direction transverse to the up-down direction. Each of the mounting seats is disposed between adjacent two of the inner guiding rails and is movable forwardly and rearwardly along a front-rear direction transverse to the up-down direction and the horizontal direction to be removed from the adjacent two of the inner guiding rails.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
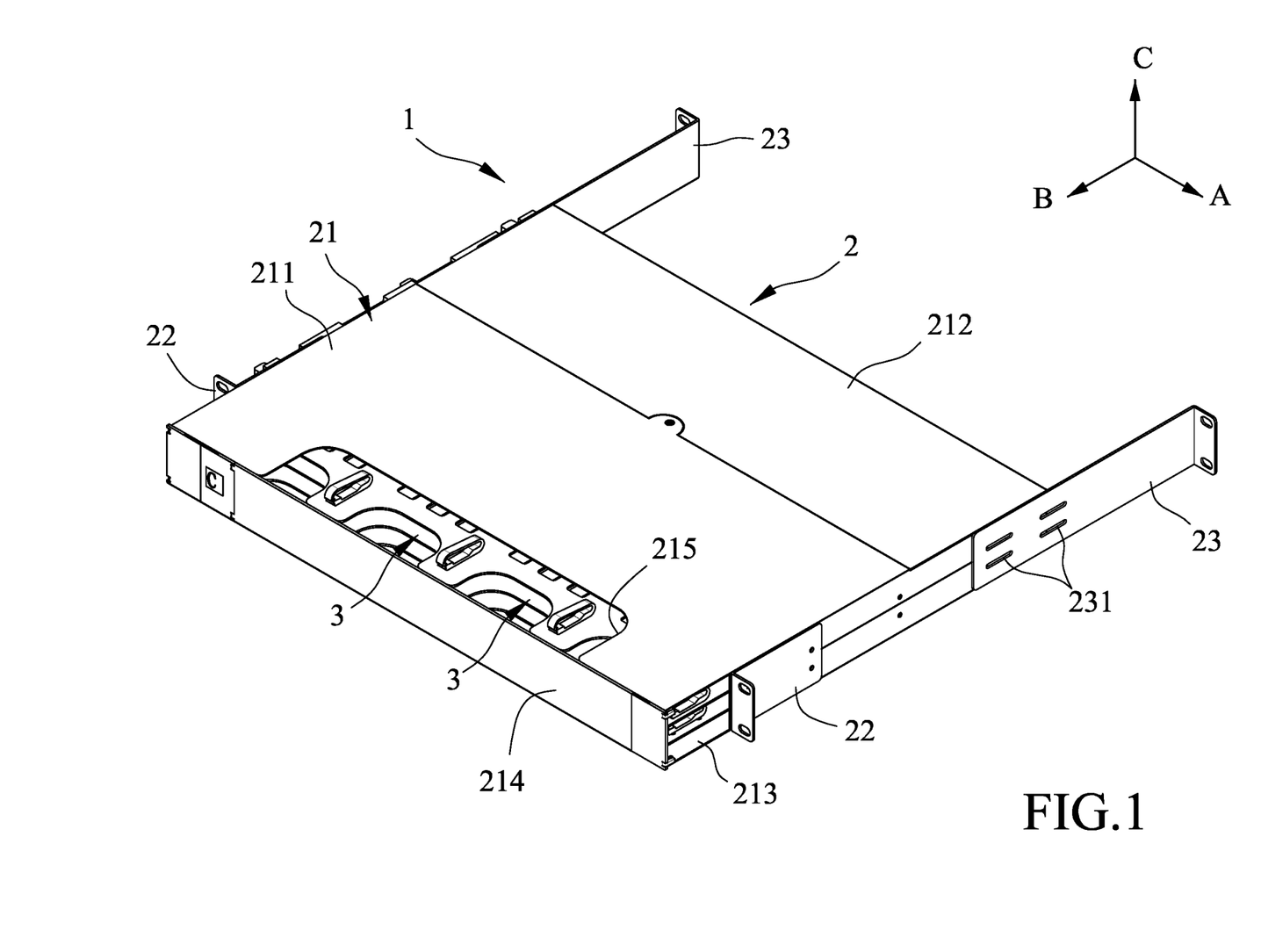
FIG. 1 is a perspective view of an embodiment of a fiber optic distribution frame of the present disclosure.
Figure 2:
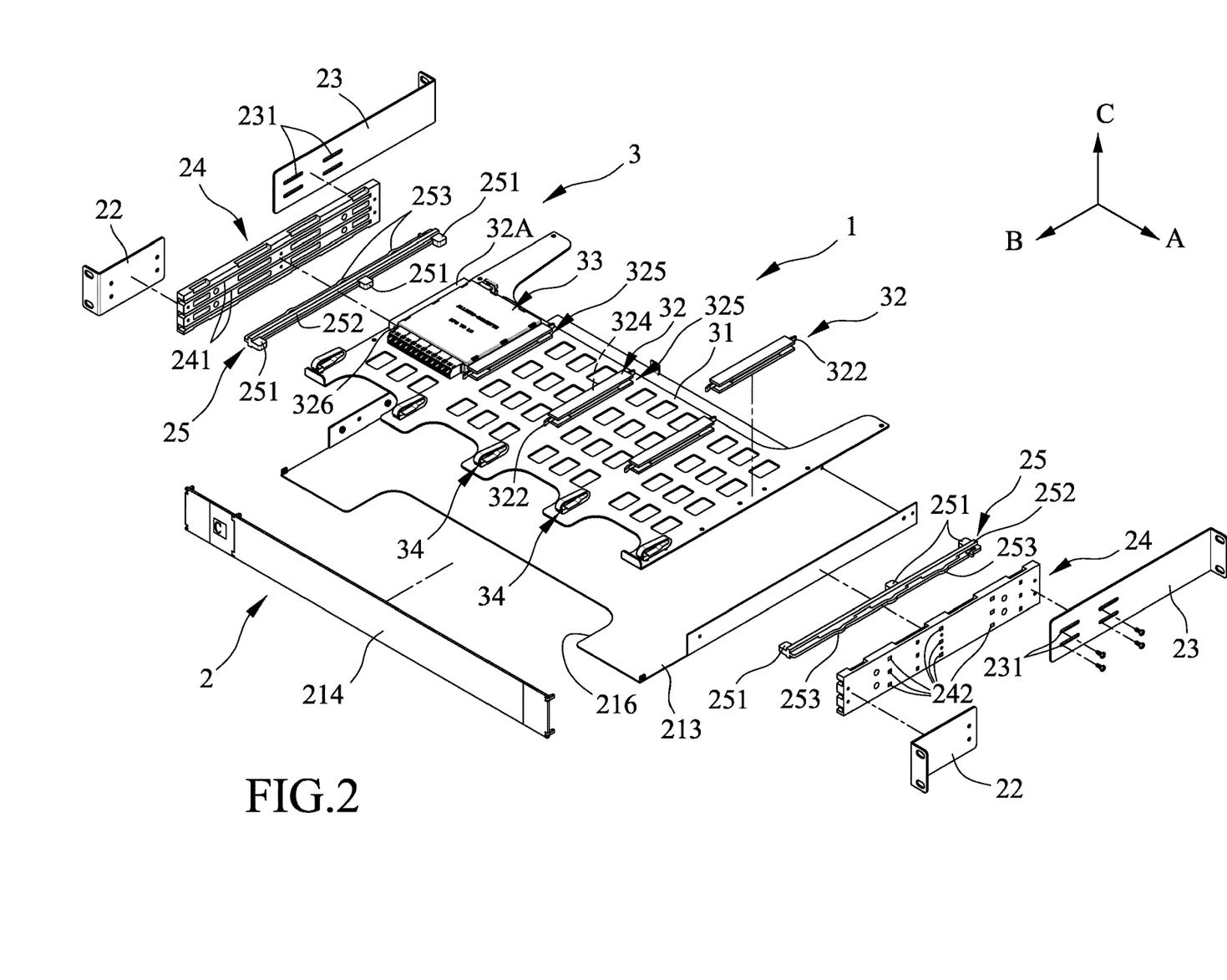
FIG. 2 is a schematic partly exploded perspective view of the embodiment, illustrating the relationships of elements of the embodiment, in which only one of tray units is shown and a front upper plate and a rear upper plate are not shown.

Referring to FIGS. 1 and 2, an embodiment of a fiber optic distribution frame 1 according to the present disclosure is shown. The fiber optic distribution frame 1 includes a casing unit 2, and a plurality of tray units 3 stacked on one another along an up-down direction (C) and disposed in the casing unit 2. The casing unit 2 includes a main housing 21, two front positioning plates 22 disposed respectively at two opposite sides of the main housing 21 along a horizontal direction (A) transverse to the up-down direction (C), two rear positioning plates 23 disposed respectively behind the front positioning plates 22 along a front-rear direction (B) transverse to the horizontal direction (A) and the up-down direction (C), two external guiding rails 24 disposed respectively on two opposite sides of the main housing 21 along the horizontal direction (A), and multiple pairs of lateral guiding members 25 respectively fixed to the tray units 3, correspondingly and slidably mounted to the external guiding rails 24, and extending along the front-rear direction (B). Each pair of the lateral guiding members 25 are arranged to be spaced apart from each other along the horizontal direction (A), and are fixed to a respective one of the tray units 3. In this embodiment, the front-rear direction (B) refers to a direction along which a user plugs and unplugs a fiber optic connector or a fiber optic adapter, but practical use is not limited thereto. The main housing 21 has a front upper plate 211 disposed above the tray units 3, a rear upper plate 212 connected to a rear side of the front upper plate 211, a lower plate 213 disposed under the tray units 3 and corresponding in position to the front upper plate 211, and a front blocking plate 214 connected to the front upper plate 211 and the lower plate 213. Each of the front positioning plates 22 is connected to the front upper plate 211 and the lower plate 213, and each of the rear positioning plates 23 is connected to the rear upper plate 212 and the lower plate 213, and is formed with a plurality of elongated holes 231 extending along the front-rear direction (B) and adapted to permit a plurality of screws to extend therethrough. The elongated holes 231 are provided for the screws to extend therethrough to connect the rear positioning plate 23 to the rear upper plate 212 and the lower plate 213, and the rear positioning plate 23 is adjustable relative to the rear upper plate 212 and the lower plate 213 along the front-rear direction (B). The front upper plate 211 defines an upper opening 215 formed therethrough along the up-down direction (C), and the lower plate 213 defines a lower opening 216 (see FIG. 2) formed therethrough along the up-down direction (C) and aligned with the upper opening 215. A user can see the internal structure of the main housing 21 through the upper and lower openings 215, 216, which is quite convenient.

Figure 4:
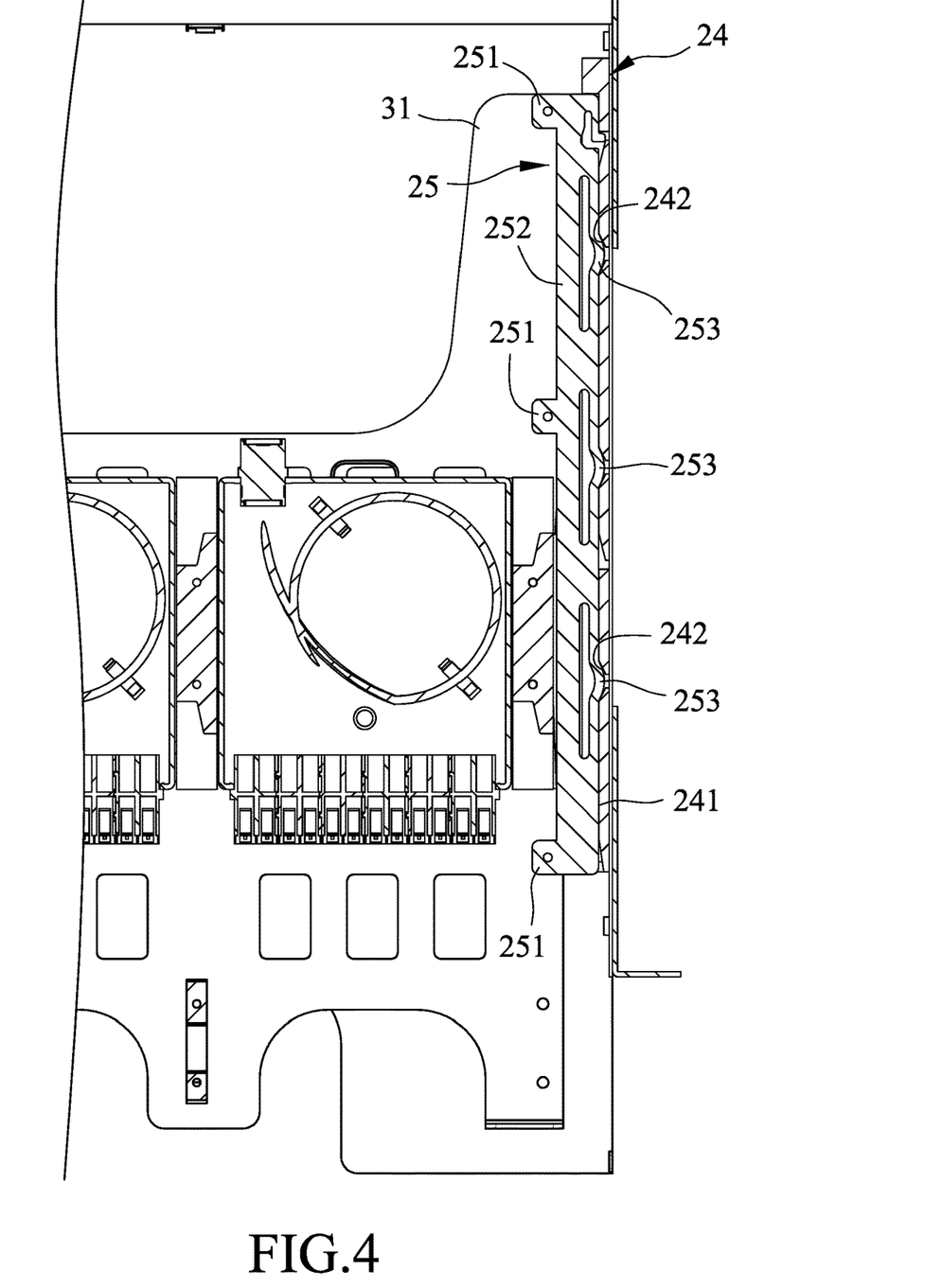
FIG. 4 is a fragmentary schematic cross-sectional view, illustrating structure of one of the tray units.

Referring to FIGS. 1, 2, and 4, the external guiding rails 24 are disposed in the main housing 21, and the lateral guiding members 25 are organized into two sets of lateral guiding members 25 that are disposed symmetric with respect to the tray units 3. Each set of the lateral guiding members 25 are disposed on a respective one of the external guiding rails 24. Each of the external guiding rails 24 is formed with a plurality of sliding slots 241 that are spaced apart along the up-down direction (C) and that extend along the front-rear direction (B), and a plurality of sets of limiting slots 242 that extend through the sliding slots 241 along the horizontal direction (A), and that are in spatial communication with the sliding slots 241. Each of the lateral guiding members 25 corresponds in position to a respective one of the sliding slots 241, and includes a plurality of coupling portions 251 connected to a corresponding one of the tray units 3, a main portion 252 connected to the coupling portions 251, and a plurality of convex portions 253 protruding outwardly from the main portion 252 along the horizontal direction (A) and respectively engaging selected ones of the limiting slots 242 of the external guiding rails 24.

Figure 3:
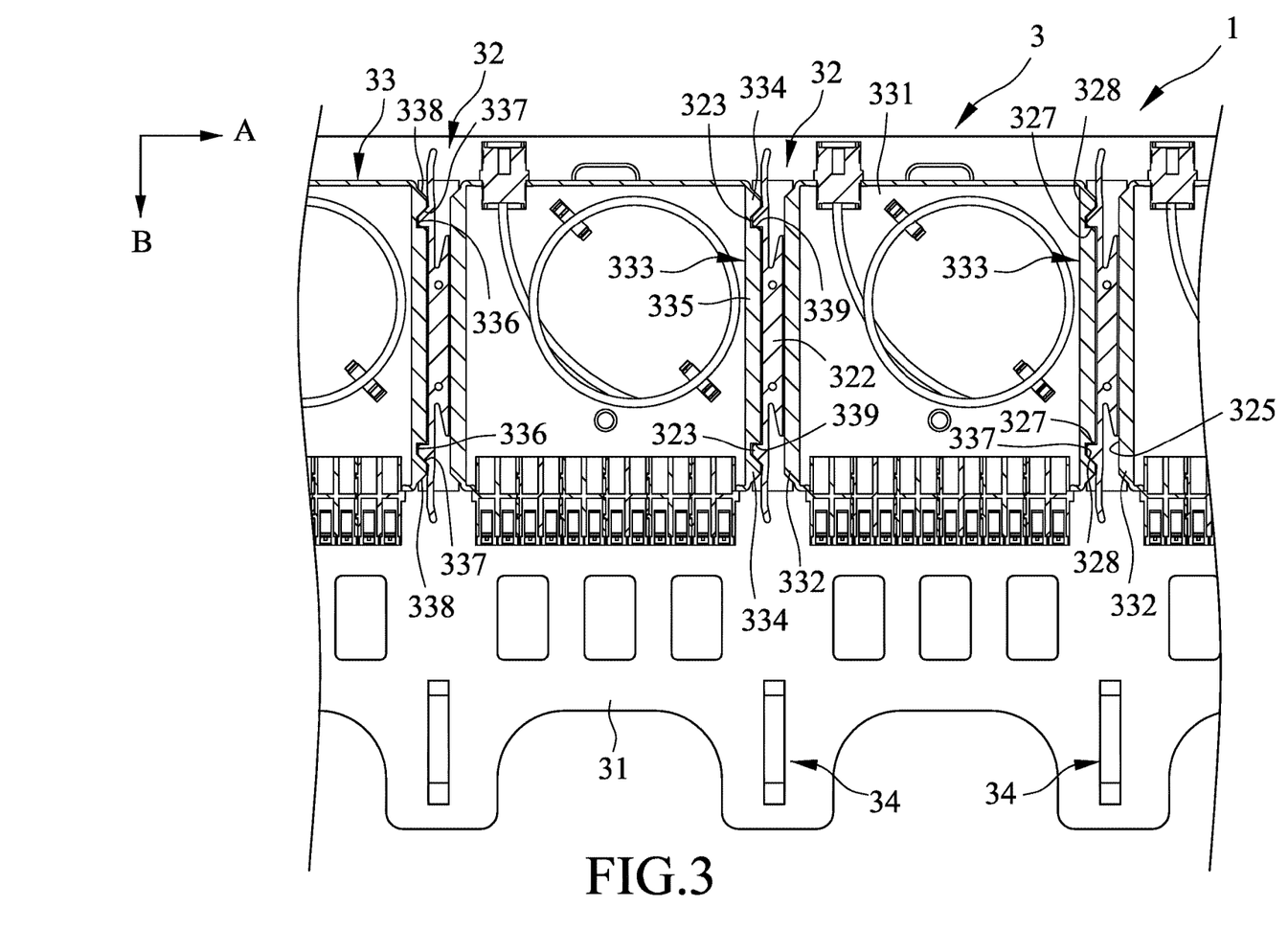
FIG. 3 is a fragmentary schematic cross-sectional view, illustrating the tray units of the embodiment.
Figure 5:
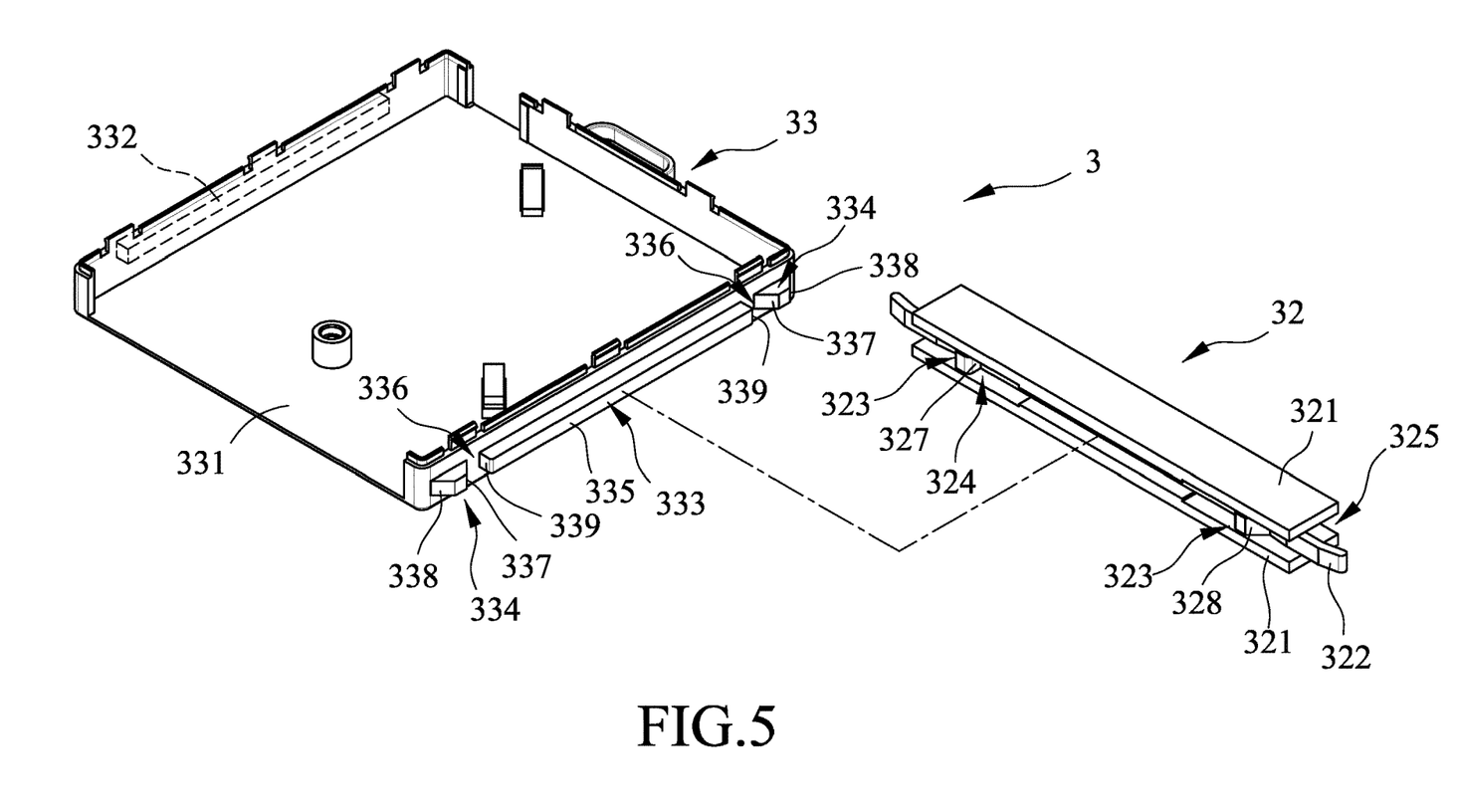
FIG. 5 is a partly exploded perspective view of an inner guiding rail and a mounting seat of one of the tray units of the embodiment.

Referring to FIGS. 2, 3 and 5, each of the tray units 3 includes a partition plate 31, a plurality of inner guiding rails 32 which are disposed on and above the partition plate 31 and spaced apart from one another along the horizontal direction (A), a plurality of mounting seats 33 each of which is disposed between adjacent two of the inner guiding rails 32 and which is adapted for mounting of optical fibers (not shown) thereon, and a plurality of cable management members 34 which are disposed respectively in front of the inner guiding rails 32 along the front-rear direction (B). The partition plate 31 has left and right sides opposite along the horizontal direction (A) and connected respectively to a corresponding pair of the lateral guiding members 25. Each of the left and right sides of the partition plate 31 is connected to the coupling portions 251 of a corresponding one of the lateral guiding members 25. In this embodiment, the number of the coupling portions 251 of each of the lateral guiding members 25 is three, but the present disclosure is not limited to this example. As shown in FIG. 5, each of the inner guiding rails 32 of each of the tray units 3 includes two plate portions 321 spaced apart from each other along the up-down direction (C), a connecting portion 322 connected to the plate portions 321, disposed between the plate portions 321, and having two opposite ends that are opposite along the front-rear direction (B), and two protruding portions 323 protruding in the same direction from the connecting portion 322 along the horizontal direction (A). The plate portions 321 cooperate with the connecting portion 322 to define a main guiding groove 324 and an auxiliary guiding groove 325 that are located respectively at opposite sides of the connecting portion 322 along the horizontal direction (A), and that open toward opposite directions, such that the protruding portions 323 extend from the connecting portion 322 into the main guiding groove 324. It should be noted that, in this embodiment, the one of the inner guiding rails 32 (which is referred to as a lateral guiding rail 32A hereinafter) that is disposed adjacent to the leftmost set of the lateral guiding members 25 shown in FIG. 2 may not include the main guiding groove 324 and the protruding portions 323, and the auxiliary guiding groove 325 of the lateral guiding rail 32A opens toward the main guiding groove 324 of an adjacent one of the inner guiding rails 32, which achieves the effect of simplifying the structure of the embodiment. In this embodiment, the main guiding groove 324 of each of the inner guiding rails 32 except for the inner guiding rail 32A opens toward the auxiliary guiding groove 325 of an adjacent one of the inner guiding rails 32. The opposite ends of the connecting portion 322 extend along the front-rear direction (B), are plate-shaped, and are resilient and flexible. Each of the protruding portions 323 of the inner guiding rails 32 has a positioning surface 327 that faces the positioning surface 327 of the other one of the two protruding portions 323 along the front-rear direction (B) and that is flat, and an inclined guiding surface 328 that is opposite to the positioning surfaces 327 along the front-rear direction (B), that is inclined relative to the positioning surface 327, and that has a right trapezoid cross section along the up-down direction (C) in this embodiment.

In the following description, since the structures of the mounting seats 33 of the tray units 3 are identical, only one of the mounting seats 33 is described for the sake of brevity. The mounting seat 33 is disposed between adjacent two of the inner guiding rails 32, has two lateral walls opposite along the horizontal direction (A), and includes a seat portion 331, a slidable portion 332 protruding from one of the lateral walls of the seat portion 331 along the horizontal direction (A), and a guiding unit 333 protruding from the other one of the lateral walls of the seat portion 331 away from the slidable portion 332 along the horizontal direction (A). The slidable portion 332 slidably engages an adjacent one of the auxiliary guiding grooves 325 of the inner guiding rails 32. The guiding unit 333 engages an adjacent one of the main guiding grooves 324 of the inner guiding rails 32 and includes two positioning slots 336 indented along the horizontal direction (A), spaced apart from each other along the front-rear direction (B), and respectively and detachably engaging the protruding portions 323 of an adjacent one of the inner guiding rails 32. The guiding unit 333 has two limiting segments 334 spaced apart from each other along the front-rear direction (B), and an intermediate segment 335 disposed between and spaced apart from the limiting segments 334. Each of the limiting segment 334 cooperates with the intermediate segment 335 to define a respective one of the positioning slots 336 along the front-rear direction (B). Each of the limiting segments 334 has an isosceles trapezoid horizontal cross section, and has an inner inclined surface 337 that faces the intermediate segment 335, and an outer inclined surface 338 that is opposite to the inner inclined surface 337 along the front-rear direction (B). The intermediate segment 335 is rectangular in cross-section along the up-down direction (C), and has two stop surfaces 339 that are flat and that respectively face the inner inclined surfaces 337 of the limiting segments 334. The positioning slots 336 respectively engage the protruding portions 323 of a corresponding one of the inner guiding rails 32, such that the stop surfaces 339 respectively abut against the positioning surfaces 327 of the protruding portions 323 of the corresponding one of the inner guiding rails 32, and the inner inclined surfaces 337 of the limiting segments 334 respectively abut against the inclined guiding surfaces 328 of the protruding portions 323.

Figure 6:
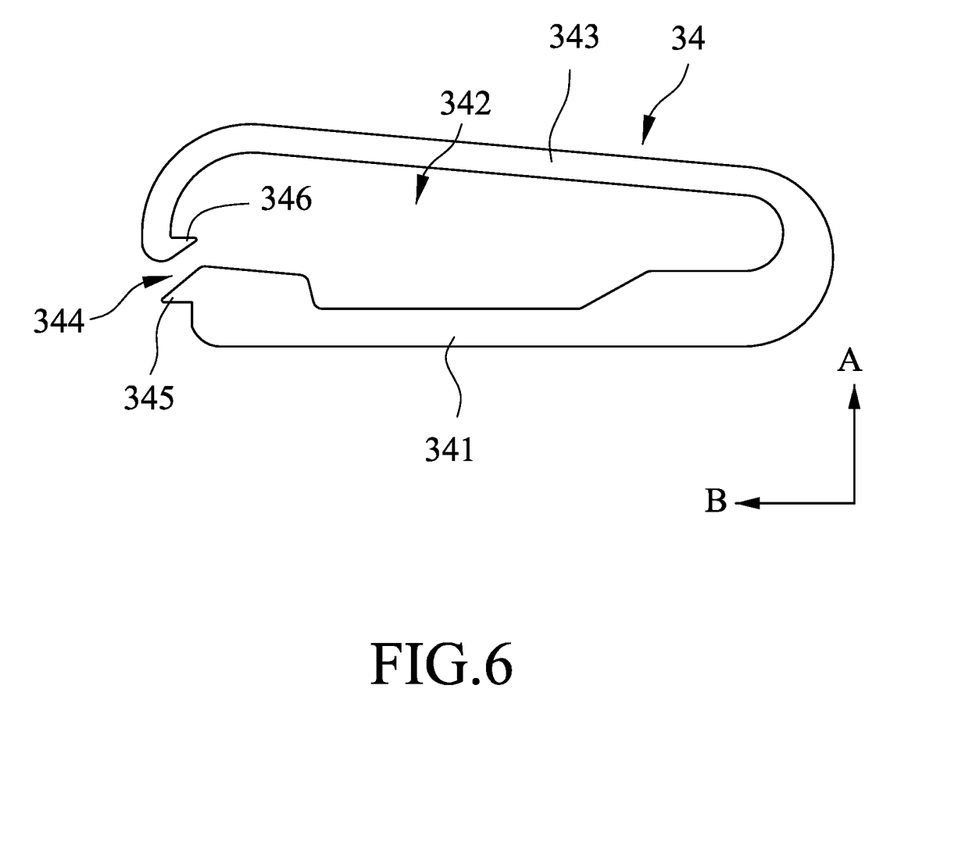
FIG. 6 is a schematic side view illustrating a cable management member of the embodiment.

Referring to FIGS. 2 and 6, each of the cable management members 34 is flexible and resilient, and includes a lower clamp portion 341 fixed to the partition plate 31, and an upper clamp portion 343 having one end that is connected to one end of the lower clamp portion 341 and cooperating with the lower clamp portion 341 to define a cable accommodating space 342 therebetween. The other end of the lower clamp portion 341 cooperates with the other end of the upper clamp portion 343 to define an open slot 344 communicating with the cable accommodating space 342. Specifically, the lower clamp portion 341 has a rear end portion connected to a rear end portion of the upper clamp portion 343, and a front end portion including an inclined front end surface 345 that is inclined forwardly and downwardly. Specifically, the upper clamp portion 343 further has a barb-shaped front end portion including a hook segment having an inclined front end surface 346 that is inclined rearwardly and upwardly and that cooperates with the front end surface 345 of the lower clamp portion 341 to define the open slot 344.

Referring back to FIGS. 2 to 4, this embodiment can be used for connectors conforming to subscriber connector/ standard connector (SC) specification and an adapter conforming to multi-fiber push on (MPO) adapter specification, but is not limited to this. By virtue of the structural design of the convex portions 253 of each of the lateral guiding members 25, the convex portions 253 are deformed to bend inwardly along the horizontal direction (A) when being subjected to a force along the front-rear direction (B). Thus, at least a portion or the entirety of each of the convex portions 253 disengages from the corresponding one of the limiting slots 242. Such a design allows a user to move the partition plate 31 of any one of the tray units 3 along the front-rear direction (B) (with the blocking plate 214 being removed in advance) such that the corresponding one of the tray units 3 is moved forwardly. For each of the lateral guiding members 25, after disengagement of the convex portions 253 from the corresponding ones of the limiting slots 242 as a result of the partition plate 31 being moved forwardly, the partition plate 31 is moved continuously and forwardly such that each of the convex portions 253 is restored to its original position and engages one of the limiting slots 242 to position the tray unit 3 relative to the casing unit 2. Then, the partition plate 31 can be further moved forwardly to provide an effect of gradually adjusting the partition plate 31. In this way, such a design prevents the tray unit 3 from being moved along the front-rear direction (B) if the tray unit 3 is accidentally touched when being moved outwardly for wiring or arranging elements disposed thereon, and is thus convenient for arranging the optical fibers.

Figure 7A:
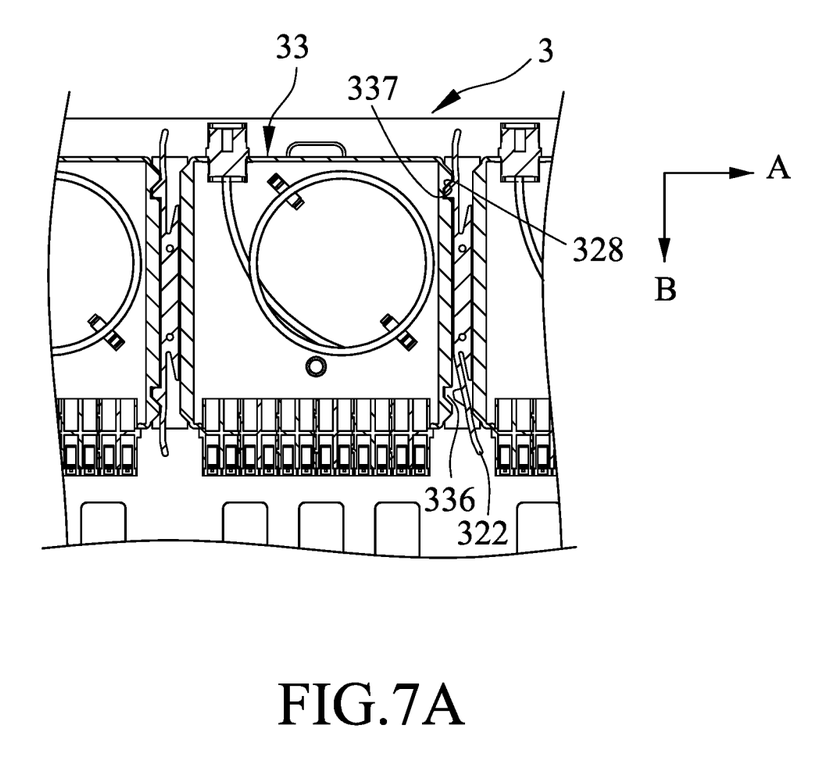
FIGS. 7A and 7B are schematic fragmentary sectional views similar to FIG. 3 and illustrating one of the mounting seats of the tray units being moved forwardly.
Figure 7B:
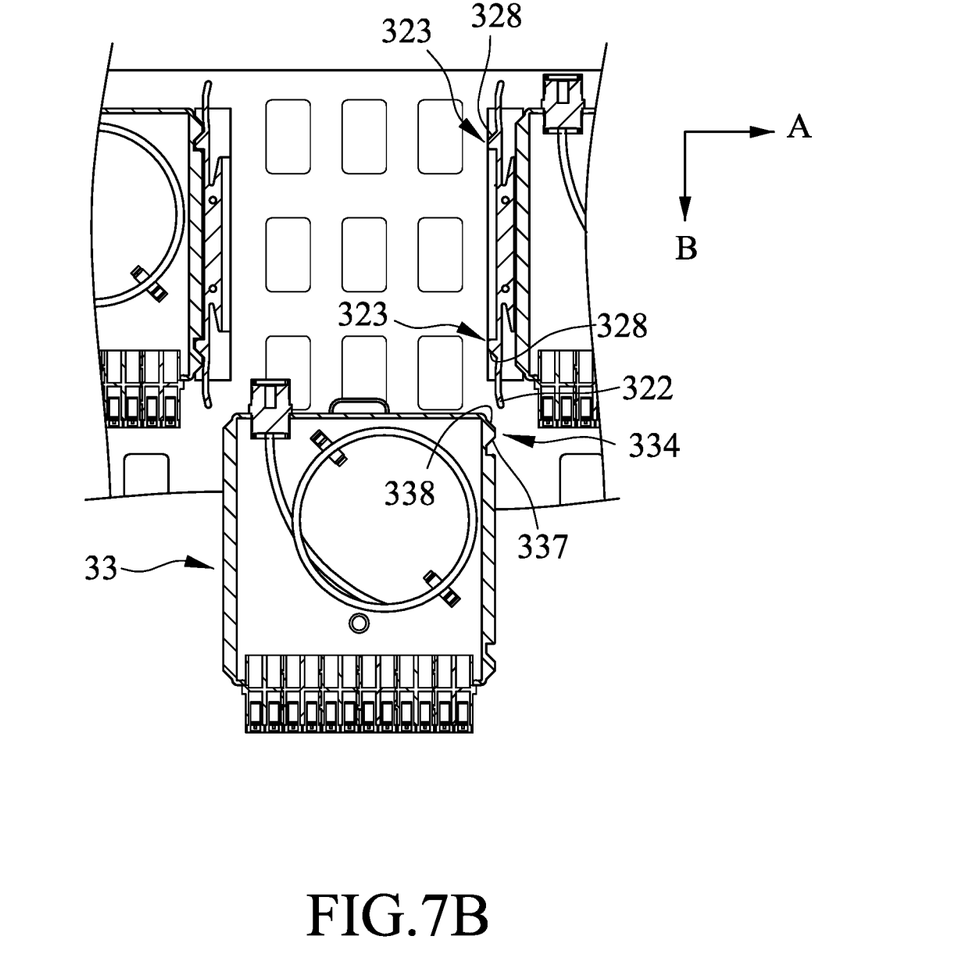
Figure 8A:
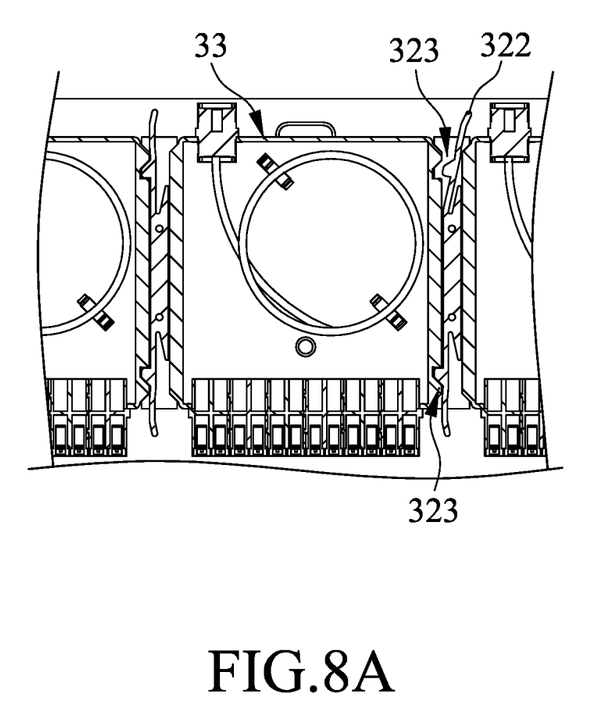
FIGS. 8A and 8B are similar to FIGS. 7A and 7B, illustrating one of the mounting seats being moved rearwardly.
Figure 8B:
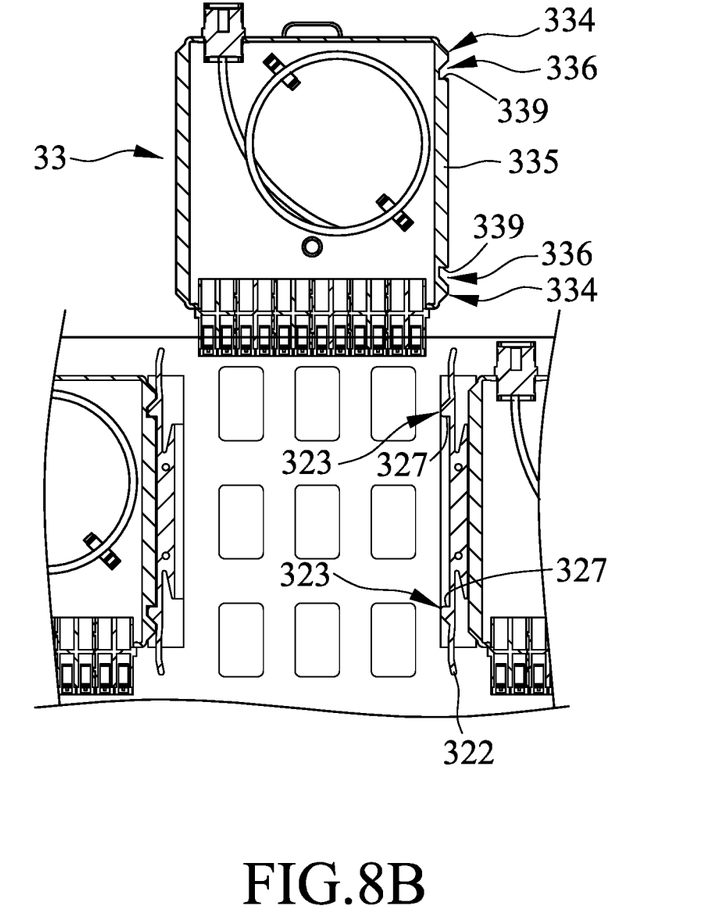

Referring to FIGS. 2, 3, 5, 7A and 7B, besides removing the partition plate 31 of each of the tray units 3 forwardly, the user can also individually remove only one mounting seat 33 along the front-rear direction (B). Specifically, one operating procedure is to exert an external force along the horizontal direction (A) on a front one of the opposite ends of the connecting portion 322 of each of the inner guiding rails 32, and the connecting portion 322 is bent such that one of the protruding portions 323 adjacent to the front one of the ends is disengaged from a corresponding one of the positioning slots 336, so as to allow the mounting seat 33 to be moved forwardly along the front-rear direction (B) from a position shown in FIG. 7A to a position shown in FIG. 7B. As shown in FIGS. 7A and 7B, when the mounting seat 33 is moving forwardly, the inner inclined surface 337 of a rear one of the limiting segment 334 comes into contact with and pushes the inclined guiding surface 328 of a rear one of the protruding portions 323 with a pushing force that has a component force along the horizontal direction (A) by virtue of the inclined structure of the inner inclined surface 337, such that a rear one of the ends of the connecting portion 322 is bent away from the mounting seat 33 and does not obstruct removal of the mounting seat 33. When it is desired to mount the mounting seat 33 to the casing unit 2, the mounting seat 33 is able to be moved rearwardly along the front-rear direction (B) so as to be disposed between corresponding two of the inner guiding rails 32. During this process, for each of the inner guiding rails 32, the outer inclined surfaces 338 of a rear one of the limiting segments 334 pushes the inclined guiding surface 328 of a front one of the protruding portions 323, with a pushing force that has a component force along the horizontal direction (A) by virtue of the inclined structure of the outer inclined surface 338 to bend the front one of the ends of the connecting portion 322 outwardly, so as to allow the mounting seat 33 to be further pushed rearwardly. Referring to FIGS. 2, 3, 8A and 8B, due to the design of the front and rear ends of the connecting portion 322, the front and rear protruding portions 322 and the front and rear limiting segments 334 that are symmetrical in structure, the user can also exert a force to bend the rear one of the ends of the connecting portion 322 so as to allow the mounting seat 33 to be moved rearwardly as shown in FIG. 8B. By virtue of allowing the mounting seat 33 to be moved forwardly and rearwardly, it is relatively convenient to move the mounting seat 33, and the flexibility of wiring and arranging elements in the fiber optic distribution frame 1 is increased. It should be noted that, the stop surfaces 339 of the intermediate segment 335 respectively abut against the positioning surfaces 327 of the protruding portions 323 of a corresponding one of the inner guiding rails 32. Since the stop surfaces 339 and the positioning surfaces 327 are flat and parallel to the horizontal direction (A), even if a force is exerted on the mounting seat 33, no component force along the horizontal direction (A) is generated. Thus, two ends of the connecting portion 322 will not be deformed and positioning of the mounting seat 33 relative to the casing unit 2 can be achieved.

Figure 9:
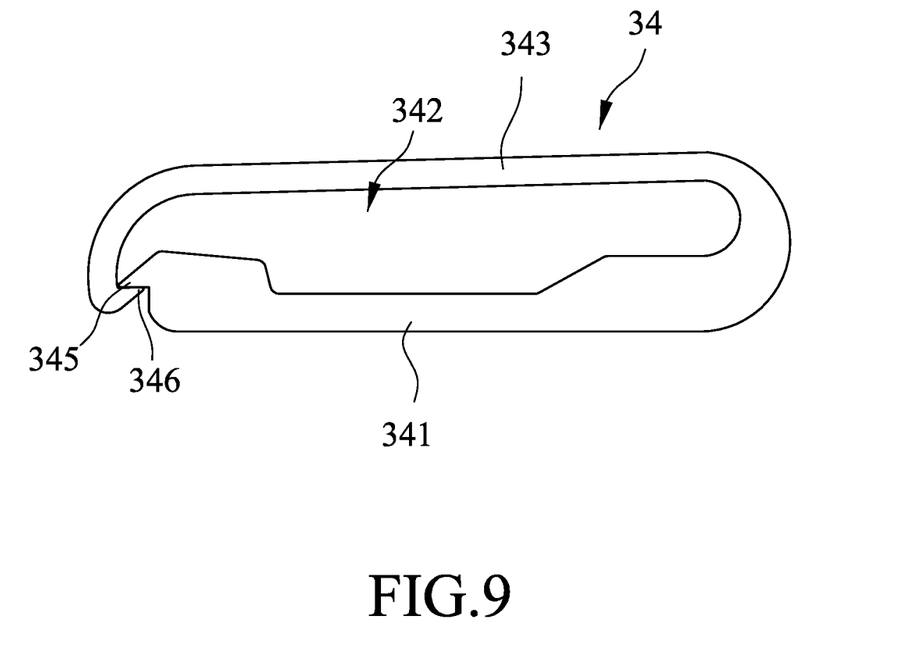
FIG. 9 is a schematic side view illustrating an open slot of the cable management member being closed.

In the following description, since the structures of the cable management members 34 are identical, only one of the cable management members 34 is described for the sake of brevity. Referring to FIGS. 2, 6, and 9, in this embodiment, by virtue of the structure of a dimension of the open slot 344 being slightly smaller than the outer diameter of each of the optical fibers disposed in the accommodating space 342 and by virtue of the barb-shaped profile of the hook segment of the upper clamp portion 343, the optical fibers disposed in the accommodation space 342 will not be easily removed from the open slot 344 by a user accidentally. Since the cable management member 34 is flexible and resilient, the inclined segment 345 of the lower clamp portion 341 can be pushed by an optical fiber from the outside of the accommodating space 342 so that a component force is exerted on the hook segment of the upper clamp portion 343 to bend the upper clamp portion 343 upwardly to thereby increase the dimension of the open slot 344 and allow the optical fiber to be quickly squeezed into the cable accommodation space 342. On the other hand, when one of the optical fibers disposed in the cable accommodating space 342 is to be removed therefrom, the upper clamp portion 343 can be pulled directly and upwardly to increase the dimension of the open slot 344, so that the front end portion of the upper clamp portion 343 is moved away from the lower clamp portion 341 to allow removal of the optical fibers through the open slot 344. To further prevent removal of the optical fibers from the cable accommodating space 342, as shown in FIG. 9, the lower clamp portion 341 and the upper clamp portion 343 can be pressed toward each other until the front end surface 345 is snapped into the hook segment of the upper clamp portion 343 to abut against the front end surface 346 of the upper clamp portion 343. Thus, an effect of closing the open slot 344 of the cable management member 34 can be achieved, which ensures that the optical fibers would not be moved out of the accommodating space 342. Of course, a user can open the open slot 344 by moving the front end surface 345 of the lower clamp portion 341 away from the front end surface 346 of the upper clamp portion 343.

In summary, by virtue of the structure of the mounting seats 33 and the inner guiding rails 32, each of the mounting seats 33 can be individually moved forwardly or rearwardly along the front-rear direction (B) to be removed to provide a two-way drawer design, which improves overall arrangement flexibility of the present disclosure, so that it is relatively easy to disassemble the tray units 3. Moreover, the structure of the cable management member 34 allows the optical fibers to be easily and quickly received in the accommodating space 342, and enables the optical fibers to be removed individually from the cable management member 34. Thus, it is relatively convenient to distribute the optical fibers in the fiber optic distribution frame 1 of the present disclosure Thus, the object of this disclosure can be indeed achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fiber optic distribution frame comprising:
a casing unit; and
a plurality of tray units stacked on one another along an up-down direction and disposed in said casing unit, each of said tray units including a partition plate, a plurality of inner guiding rails disposed on and above said partition plate and spaced apart from one another along a horizontal direction transverse to the up-down direction, and a plurality of mounting seats each disposed between adjacent two of said inner guiding rails and movable forwardly and rearwardly along a front-rear direction transverse to the up-down direction and the horizontal direction to be removed from the adjacent two of said inner guiding rails;
wherein each of said inner guiding rails of each of said tray units includes
two plate portions that are spaced apart from each other along the up-down direction,
a connecting portion that is connected between said plate portions, and that has two ends opposite along the front-rear direction and being resilient and flexible, and
two protruding portions that protrude from said coupling portion in the same direction along the horizontal direction, said plate portions cooperating with said connecting portion to define a main guiding groove and an auxiliary guiding groove that are located respectively at opposite sides of said connecting portion along the horizontal direction, said protruding portions extending from said connecting portion into said main guiding groove;
wherein each of said mounting seats includes a seat portion that has two lateral walls opposite along the horizontal direction, a slidable portion that protrudes from one of said lateral walls of said seat portion along the horizontal direction, and a guiding unit that protrudes from the other one of said lateral walls of said seat portion away from said slidable portion along the horizontal direction, said guiding unit including two positioning slots indented along the horizontal direction, spaced apart from each other along the front-rear direction, and respectively and detachably engaging said protruding portions of an adjacent one of said inner guiding rails; and
wherein, for each of said mounting seats, said slidable portion and said guiding unit slidably and respectively engage an adjacent one of said auxiliary guiding grooves of said inner guiding rails and an adjacent one of said main guiding grooves of said inner guiding rails.

2. The fiber optic distribution frame as claimed in claim 1, wherein said guiding unit of each of said mounting seats further includes two limiting segments that are spaced apart from each other along the front-rear direction, and an intermediate segment disposed between and spaced apart from said limiting segments, each of said limiting segments cooperating with said intermediate segment to define a respective one of said positioning slots such that, for each of said inner guiding rails, when an external force along the horizontal direction is applied on one of said ends of said connecting portion, said connecting portion is bent such that one of said protruding portions adjacent to said one of said ends disengages from a corresponding one of said positioning slots, so as to allow said mounting seat to be moved forwardly and rearwardly relative to said casing unit along the front-rear direction.

3. The fiber optic distribution frame as claimed in claim 2, wherein each of said protruding portions of each of said inner guiding rails has a positioning surface that faces said positioning surface of the other one of said two protruding portions along the front-rear direction and that is flat, and an inclined guiding surface that is opposite to said positioning surface along the front-rear direction and that is inclined relative to said positioning surface,
for each of said mounting seats, said intermediate segment of said guiding unit having two stop surfaces that respectively face said limiting segments and that are flat, each of said limiting segments having an isosceles trapezoid cross section, an inner inclined surface that faces a respective one of said stop surfaces, and an outer inclined surface that is opposite to said inner inclined surface along the front-rear direction, said stop surfaces respectively abutting against said positioning surfaces of said protruding portions of a corresponding one of said inner guiding rails, said inner inclined surfaces of said limiting segments respectively abutting against said inclined guiding surfaces of said protruding portions.

4. The fiber optic distribution frame as claimed in claim 3, wherein said casing unit includes a main housing, two external guiding rails disposed respectively on two opposite sides of said main housing along the horizontal direction, and a plurality of pairs of lateral guiding members respectively fixed to said tray units and correspondingly and slidably mounted to said external guiding rails, and extending along said front-rear direction, each pair of said lateral guiding members being arranged to be spaced apart from each other along the horizontal direction.

5. The fiber optic distribution frame as claimed in claim 4, wherein each of said external guiding rails of said casing unit is formed with a plurality of sliding slots spaced apart along the up-down direction and extending along the front-rear direction, and a plurality of limiting slots extending through said external guiding rail along the horizontal direction, and being in spatial communication with said sliding slots, each of said lateral guiding members corresponding in position to a respective one of said sliding slots, and including a plurality of coupling portions that are connected fixedly to said partition plate of a corresponding one of said tray units, a main portion that is connected to said coupling portions, and a plurality of convex portions that protrude outwardly from said main portion along the horizontal direction and that respectively engage selected ones of said limiting slots of said external guiding rails.

6. The fiber optic distribution frame as claimed in claim 5, wherein said main housing of said casing unit has a front upper plate disposed above said tray units, a rear upper plate connected to a rear side of said front upper plate, a lower plate disposed under said tray units and corresponding in position to said front upper plate, and a front blocking plate connected to said front upper plate and said lower plate, said front upper plate defining an upper opening formed therethrough along the up-down direction, said lower plate defining a lower opening formed therethrough along the up-down direction and aligned with said upper opening.

7. The fiber optic distribution frame as claimed in claim 6, wherein said casing unit further includes two front positioning plates disposed respectively at two opposite sides of said main housing along the horizontal direction, and two rear positioning plates disposed respectively behind said front positioning plates, each of said front positioning plates being connected to said front upper plate and said lower plate, said rear positioning plates being connected to said rear upper plate and said lower plate, each of said rear positioning plates being formed with a plurality of elongated holes each extending along the front-rear direction and adapted to permit a screw to extend therethrough.

8. The fiber optic distribution frame as claimed in claim 1, wherein each of the tray units further includes a plurality of cable management members disposed respectively in front of said inner guiding rails along the front-rear direction, each of said cable arrangement members including a lower clamp portion that is fixed to said partition plate, and an upper clamp portion that has one end connected to one end of said lower clamp portion and that cooperates with said lower clamp portion to define a cable accommodating space therebetween, the other end of said lower clamp portion cooperating with the other end of said upper clamp portion to define an open slot in spatial communication with said cable accommodating space.

9. The fiber optic distribution frame as claimed in claim 8, wherein said lower clamp portion of each of said cable management members has a rear end portion connected to a rear end portion of said upper clamp portion, and a front end portion including an inclined front end surface that is inclined forwardly and downwardly, said upper clamp portion further having a barb-shaped front end portion including a hook segment having an inclined front end surface that is inclined rearwardly and upwardly and that cooperates with said front end surface of said lower clamp portion to define said open slot.

* * * * *